(12) United States Patent
Yarnell

(10) Patent No.: US 8,185,691 B2
(45) Date of Patent: May 22, 2012

(54) OPTIMIZED CACHE COHERENCY IN A DUAL-CONTROLLER STORAGE ARRAY

(75) Inventor: Gregory A. Yarnell, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 996 days.

(21) Appl. No.: 12/165,181

(22) Filed: Jun. 30, 2008

(65) Prior Publication Data

US 2009/0327600 A1    Dec. 31, 2009

(51) Int. Cl.
*G06F 12/00*    (2006.01)
*G06F 12/08*    (2006.01)

(52) U.S. Cl. . 711/118; 711/113; 711/114; 711/E12.001; 711/E12.019

(58) Field of Classification Search ........... 711/118, 711/113, 114, E12.001, E12.019
See application file for complete search history.

(56) References Cited

U.S. PATENT DOCUMENTS 7,058,848 B2 *    6/2006    Sicola et al. .................. 714/4.3

* cited by examiner

*Primary Examiner* — Yong Choe
(74) *Attorney, Agent, or Firm* — Haynes and Boone, LLP

(57) ABSTRACT

Data is cached in a dual-controller storage array having a first cache controlled by a first controller, a second cache controlled by a second controller, and a shared array of persistent storage devices, such as disk drives. When one of the controllers receives a write request, it stores the data in persistent storage, stores a copy of that data in the first cache, and transmits identification data to the second controller that identifies the data written to persistent storage. Using the identification data, the second controller invalidates any data stored in the second cache that corresponds to the data that the first controller wrote to persistent storage. If a controller receives a read request, and the requested data is validly stored in its cache, the controller retrieves it from the cache; otherwise, the controller reads the requested data from persistent storage and caches a copy of the requested data.

14 Claims, 2 Drawing Sheets

OPTIMIZED CACHE COHERENCY IN A DUAL-CONTROLLER STORAGE ARRAY

TECHNICAL FIELD OF THE INVENTION

The invention relates generally to storage arrays and data caching and, more specifically, to dual-controller storage arrays having a data caching feature.

BACKGROUND OF THE INVENTION

A storage array or disk array is a data storage device that includes multiple disk drives or similar persistent storage units. A storage array can allow large amounts of data to be stored in an efficient manner. A storage array also can provide redundancy to promote reliability, as in the case of a Redundant Array of Inexpensive Disks (RAID) storage array. A storage array commonly also includes a suitable enclosure, power supply, one or more controllers (typically in the form of one or more circuit boards), and interfaces to connect the storage array to an external host, such as a computer or network device. The controller includes the intelligence or logic (i.e., a client) that causes the storage array to read or write data to or from its persistent storage in response to requests received from an external host.

Some storage arrays include cache memory in which the controller temporarily stores data that has been read from or written to the disks or other persistent storage. Caching is a technique by which data that recently has been read from or written to persistent storage is stored in a random-access, semiconductor memory, so that it can be accessed more quickly than if it were required to access the persistent storage again.

One type of RAID storage array includes two controllers that share access to the persistent storage. Transaction logic is commonly employed to allow the two controllers to share access to the persistent storage without interfering with one another. A transaction, as the term is used in the context of databases, is a database operation that is ensured by the transaction logic to be performed in an "all or nothing" manner, so that the operation is either completed in its entirety or has no effect. Transaction logic also ensures that each transaction is isolated from all other transactions.

Some dual-controller storage arrays include cache memory. Providing a caching feature in a dual-controller storage array requires special design considerations to ensure that the controllers maintain cache data coherency between the cache memories under control of the respective controllers. In some dual-controller storage arrays that have a caching feature, the data stored in the cache memory that is under the control of one controller is copied to the cache memory that is under the control of the other controller. This method is sometimes referred to as "mirrored caching." Although copying data provides the requisite cache data coherency, it consumes time and system resources and thus can be inefficient.

Another method by which the problem of maintaining cache data coherency has been addressed involves caching data read from or written to persistent storage for no longer than a single transaction (during which time it is ensured that the other controller cannot access persistent storage). A disadvantage of this method is that the amount of data that can be cached is limited to that which is useful during only a single transaction. Typically, only data that the controller needs to access multiple times during the transaction is cached, such as directory pointers and file system structures in an instance in which the transaction involves reading multiple chunks of data from persistent storage. Cached data is discarded when the transaction is completed.

SUMMARY

The invention relates to caching data in a storage array having two or more controllers, a first data cache controlled by one of the controllers, a second data cache controlled by another (second) controller, and an array of persistent storage devices, such as disk drives. Each of the two controllers can handle requests received from external devices to write and read data to and from persistent storage. When one of the controllers receives such a write request, along with the associated data to be written, it initiates a write transaction. The controller stores the write data in the persistent storage in accordance with standard transaction processing principles. So long as the transaction completes, the first controller copies the same data that was written to persistent storage to the first data cache and transmits identification data to the second controller that identifies the data that was written to persistent storage. It should be noted that the first controller does not transmit any of the write data itself to the second controller.

The second controller uses the identification data to identify any data stored in the second data cache that corresponds to the data that the first controller wrote to persistent storage. It should also be noted that the second data cache is under exclusive control of the second controller and not accessible to the first controller, while the first data cache is under exclusive control of the first controller and not accessible to the second controller. If the second controller identifies any such corresponding data in the second data cache, the second controller discards or otherwise invalidates that cached data.

If one of the controllers receives a read request from an external device, it initiates a read transaction. The controller retrieves the requested data from persistent storage in accordance with standard transaction processing principles. The controller then returns the retrieved data to the external device that requested it. The controller also stores a copy of the retrieved data in its associated data cache. If that controller later receives a read request for the same data that it previously cached, and the data still validly exists in the cache, the controller retrieves it from the cache rather than from persistent storage. However, if the data does not still validly exist in the cache, the controller retrieves it from persistent storage.

DETAILED DESCRIPTION OF AN ILLUSTRATIVE EMBODIMENT

Figure 1:
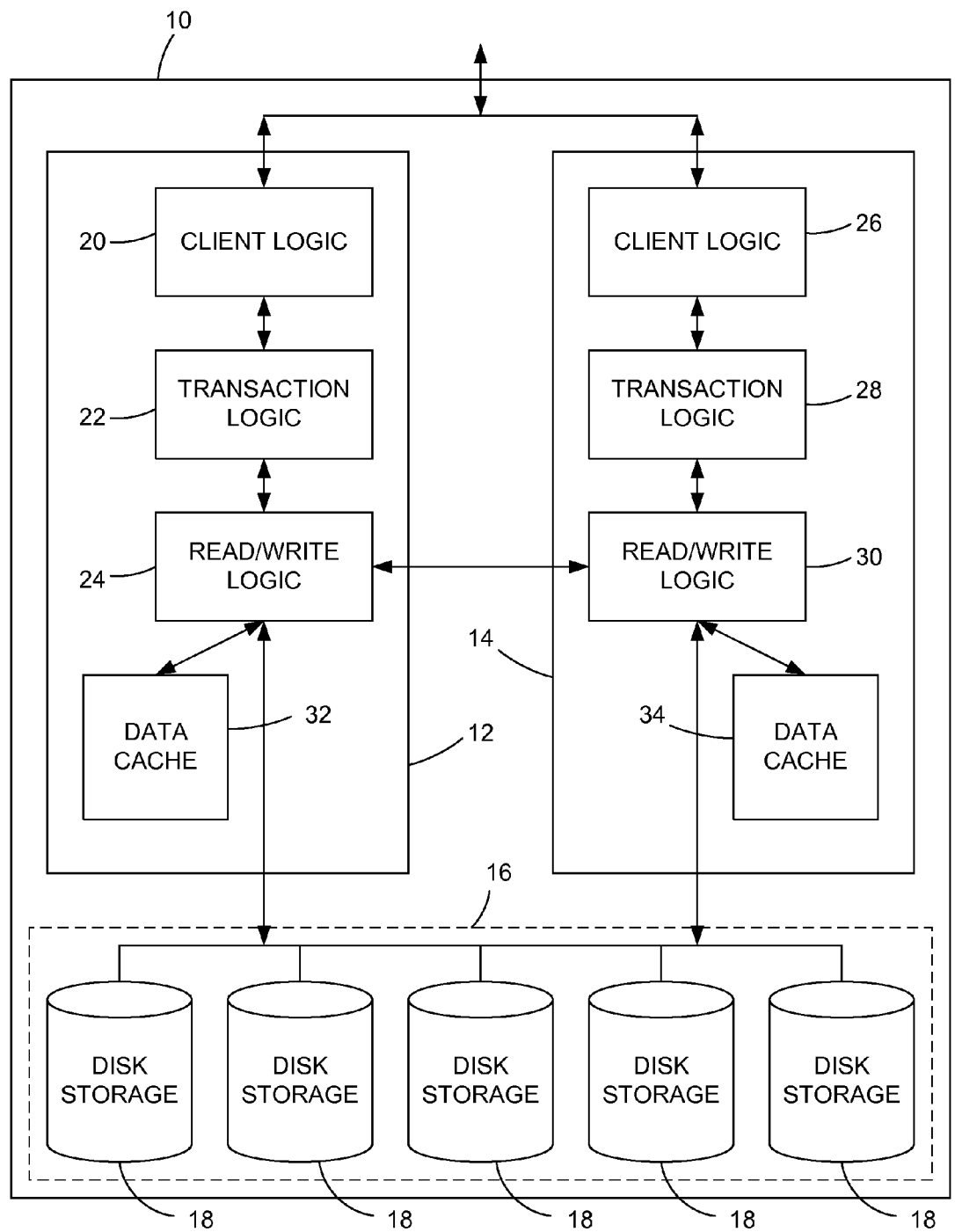
FIG. 1 is a block diagram of a dual-controller storage array in accordance with an exemplary embodiment of the present invention.

As illustrated in FIG. 1, in an illustrative or exemplary embodiment of the invention, a storage array 10 includes two controllers 12 and 14 and persistent storage 16. Persistent storage 16 includes an array of disk drives 18. But for the novel features described below, controllers 12 and 14 read data from and write data to persistent storage 16 in the manner of a conventional dual-controller Redundant Array of Inexpensive Disks (RAID) storage array. As the operation and structure of conventional RAID storage arrays are well known to persons skilled in the art to which the invention relates, such conventional aspects are not described in further detail in this patent specification ("herein") for purposes of clarity.

Each of controllers 12 and 14 can include any suitable conventional elements, such as microprocessors, memory, hard-wired logic, etc., that in accordance with suitable programming or configuration logic allow it to effect the functions or methods described below, as well as any other suitable functions that persons skilled in the art understand are characteristic of conventional RAID storage arrays. Such programming logic can be stored in the form of software or firmware that has been loaded into memory for execution by one or more processors, either on an as-needed or random-access basis or as firmware stored in non-volatile memory (e.g., programmable read-only memory). Logic elements of controller 12 that relate to the functions or methods of the present invention include client logic 20, transaction logic 22 and read/write logic 24. Logic elements of controller 14 that relate to the functions or methods of the present invention include client logic 26, transaction logic 28 and read/write logic 30. Except for where it may be specifically stated otherwise below, client logic 20 and 26 are identical to each other, transaction logic 22 and 28 are identical to each other, and read/write logic 24 and 30 are identical to each other. Each of these logic elements can correspond to collections or segments of software or firmware programming code. Accordingly, the logic elements as stored in such memory in the form of software or firmware constitute a "computer program product" as that term is used in the patent lexicon.

Controller 12 also includes a data cache memory 32, and controller 14 includes a data cache memory 34. Data cache memory 32 is under exclusive control of controller 12, and controller 14 cannot access it. Likewise, data cache memory 34 is under exclusive control of controller 14, and controller 12 cannot access it.

The logic elements operate in the manner described below with regard to the exemplary method illustrated in FIG. 2. In view of the descriptions herein, persons skilled in the art will be capable of programming or configuring controllers 12 and 14 to effect such methods. It should be noted that in the exemplary method controllers 12 and 14 are identically programmed or configured. Therefore, any steps described herein for purposes of illustration as performed by one of them can, in other instances, be performed by the other. It should also be noted that storage array 10 can process data read and write requests in any suitable order and at any suitable time, and the exemplary order in which the steps are described herein is that which is believed to best illustrate the inventive concepts. Furthermore, the steps described herein are those that directly pertain to the invention, and it should be understood that storage array 10 can additionally perform other steps that are conventionally performed by such storage arrays. For example, to free up cache space when the cache becomes full, data that has not been accessed recently and thus is unlikely to be needed can be discarded in a conventional manner by employing a least-recently used algorithm.

Figure 2:
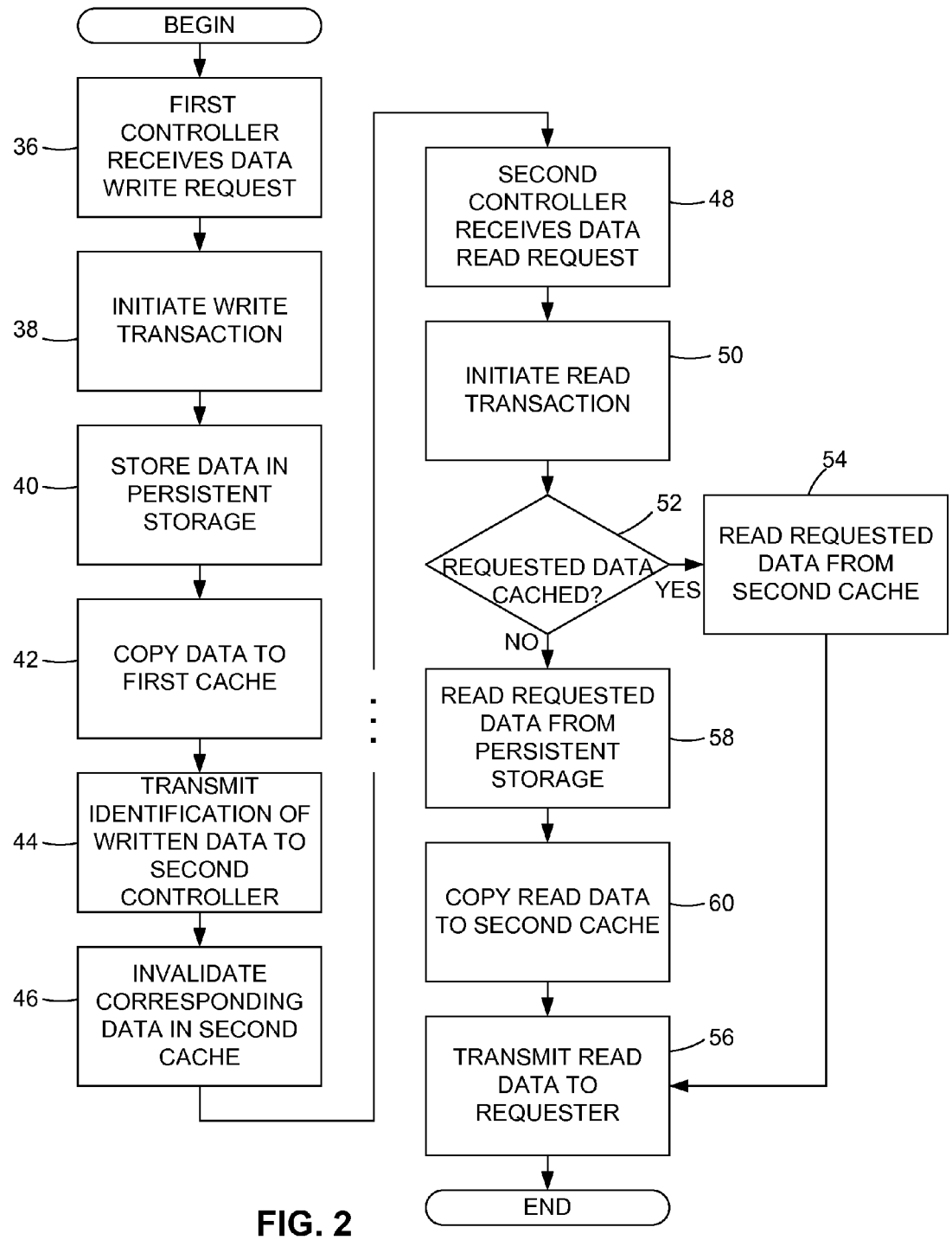
FIG. 2 is a flow diagram of a method for writing to and reading from the storage array of FIG. 1, in accordance with the exemplary embodiment of the invention.

As illustrated in FIG. 2, and with further reference to FIG. 1, an exemplary embodiment of a method for caching data in storage array 10 is initiated when one of controllers 12 and 14 receives a data write request from an external source (host), such as a computer or network to which storage array 10 is connected. Which of controllers 12 or 14 receives the request can be determined in any conventional manner known in the art. The external host also supplies the data to be written to persistent storage 16 in accordance with the request.

In an instance in which it is controller 12 that processes the data write request, client logic 20 receives the request, as indicated by step 36, and provides it to transaction logic 22. Transaction logic 22 responds to the data write request by initiating a write transaction, i.e., granting the request for a write transaction, as indicated by step 38. Transaction logic 22 sends an indication that the transaction has been granted to read/write logic 24. In response to the indication that the transaction has been granted, read/write logic 24 writes the data to (i.e., stores the data in) persistent storage 16, as indicated by step 40. In addition to storing the data in persistent storage 16, read/write logic 24 also stores a copy of that data in data cache memory 32, as indicated by step 42.

The term "transaction" is used herein in the context of database transactions. Accordingly, the transactions described herein conform to the well-known principles by which database transactions operate. The principles are sometimes referred to in the art by the acronym ACID: atomic, consistent, isolated and durable. As transaction principles and the manner in which transactions are performed are well understood in the art, these aspects are not described in detail herein. It can be noted, however, that a simple transaction, such as a data read or write, generally comprises the steps of: (1) initiating the transaction; (2) executing one or more data manipulations; and (3) if no errors occur, then either committing the transaction or rolling it back.

So long as the write transaction completes (i.e., is not rolled back), read/write logic 24 causes identification data to be transmitted from controller 12 to controller 14 via a communication link, as indicated by step 44. The identification data identifies to controller 14 the write data that read/write logic 24 just wrote to persistent storage 16 and copied to data cache memory 32. Note that controller 12 does not transmit any of the write data itself to controller 14.

As indicated by step 46, read/write logic 30 of controller 14 receives and uses the identification data to identify any data stored in data cache memory 34 that corresponds to the data that read/write logic 24 of controller 12 wrote to persistent storage 16. If read/write logic 30 identifies any such data in data cache memory 34, it discards or otherwise invalidates that data in some suitable manner, such as by noting its address and invalidity in a table (not shown) that identifies the storage locations of valid and invalid cached data.

The above-described write operation can occur at any time, in response to a request received from an external host. A read operation can similarly occur at any time, i.e., either before or after a write operation or another read operation. For example, at some time after controller 12 has written data to persistent storage 16 in the manner described above, client logic 26 of controller 14 may receive a data read request. Client logic 26 receives the request, as indicated by step 48, and provides it to transaction logic 28. Transaction logic 28 responds to the data read request by initiating a read transaction, i.e., granting the request for a read transaction, as indicated by step 50. Transaction logic 28 sends an indication that the transaction has been granted to read/write logic 30. In response to the indication that the transaction has been granted, read/write logic 30 determines whether the requested data is available from data cache memory 34.

If, as indicated by step 52, the requested data is (validly) stored in data cache memory 34, then read/write logic 30 reads (i.e., retrieves) the requested data from data cache memory 34, as indicated by step 54. Read/write logic 30 then forwards the retrieved data back to transaction logic 28, which in turn forwards it to client logic 26 for transmission to the external host that initiated the request, as indicated by step 56. If, however, the requested data is not (validly) stored in data cache memory 34, then read/write logic 30 reads the requested data from persistent storage 16, as indicated by step 58. Read/write logic 30 then stores a copy of that retrieved data in data cache memory 34, as indicated by step 60. Read/write logic 30 also forwards the retrieved data back to transaction logic 28, which in turn forwards it to client logic 26 for transmission to the external host that initiated the request, as indicated by step 56.

As illustrated by the above-described exemplary embodiment, the present invention provides a data caching method and system for a dual-controller storage array in which cache coherency is maintained, even though data is not copied from one cache to the other and even though data may be cached for longer than a single transaction, by invalidating cached data when corresponding data has been newly written to persistent storage. Extending the life of cached data beyond the boundaries of a single transaction promotes fewer storage accesses and thus more efficient operation.

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for caching data in a storage array having two controllers and an array of persistent storage devices, comprising:
   receiving a data write request and associated write data from an external host;
   a first controller initiating a write transaction in response to the data write request, the write transaction preventing a second controller from accessing the persistent storage devices during the write transaction;
   the first controller storing the write data in at least one of the persistent storage devices in accordance with the write transaction;
   the first controller copying the write data to a first data cache, the first data cache under exclusive control of the first controller and not accessible to the second controller;
   after the write transaction completes, the first controller transmitting identification data identifying the write data to the second controller but not transmitting any of the write data itself to the second controller;
   the second controller identifying corresponding cached data in a second data cache in response to the identification data, the second data cache under exclusive control of the second controller and not accessible to the first controller;
   and the second controller invalidating the corresponding cached data in the second data cache.

2. The method claimed in claim 1, further comprising:
   receiving a data read request from an external host;
   the second controller initiating a read transaction in response to the data read request, the read transaction preventing the first controller from accessing the persistent storage devices during the transaction;
   the second controller determining if valid data responsive to the data read request is present in the second data cache;
   if the second controller determines that valid data responsive to the data read request is present in the second data cache, then:
      the second controller retrieving the valid data responsive to the data read request from the second data cache; and
      the second controller transmitting the data retrieved from the second data cache to the external host;
   if the second controller determines that valid data responsive to the data read request is not present in the second data cache, then:
      the second controller retrieving the valid data responsive to the data read request from at least one of the persistent storage devices, the data retrieved from the at least one of the persistent storage devices defining read data;
      the second controller copying the read data to the second data cache; and
      the second controller transmitting the read data to the external host.

3. The method claimed in claim 2, wherein:
   the step of receiving a data read request from an external host comprises second client logic communicating the data read request to second transaction logic;
   the step of the second controller initiating a read transaction in response to the data read request comprises second transaction logic determining if the data read request can be granted and, if the data read request can be granted, instructing second read/write logic to retrieve the read data from the at least one of the persistent storage devices.

4. The method claimed in claim 3, wherein:
   the step of the first controller copying the write data to a first data cache comprises the first read/write logic copying the write data to the first data cache; and
   the step of the second controller determining if valid data responsive to the data read request is present in the second data cache comprises the second read/write logic determining if valid data responsive to the data read request is present in the second data cache.

5. The method claimed in claim 1, wherein:
   the step of receiving a data write request and associated write data from an external host comprises first client logic communicating the data write request to first transaction logic;
   the step of the first controller initiating a write transaction in response to the data write request comprises the first transaction logic determining if the data write request can be granted and, if the data write request can be granted, the first transaction logic instructing first read/write logic to store the write data in the at least one of the persistent storage devices.

6. The method claimed in claim 5, wherein:
   the step of the first controller copying the write data to a first data cache comprises the first read/write logic copying the write data to the first data cache;
   the first controller transmitting identification data identifying the write data to the second controller comprises the first read/write logic transmitting the identification data to second read/write logic via a communication channel between the first and second controllers; and
   the step of the second controller invalidating the corresponding cached data in the second data cache comprises the second read/write logic invalidating the corresponding cached data.

7. A storage array system, comprising:
   an array of persistent storage devices;
   a first controller, the first controller controlling access to the persistent storage devices, the first controller having a first data cache;

a second controller, the second controller controlling access to the persistent storage devices, the second controller having a second data cache; and wherein the first and second controllers are programmed or configured to effect the steps of:

the first controller initiating a write transaction in response to a data write request initiated by an external host, the write transaction preventing the second controller from accessing the persistent storage devices during the write transaction;

the first controller storing the write data in at least one of the persistent storage devices in accordance with the write transaction;

the first controller copying the write data to a first data cache, the first data cache under exclusive control of the first controller and not accessible to the second controller;

after the write transaction completes, the first controller transmitting identification data identifying the write data to the second controller but not transmitting any of the write data itself to the second controller;

the second controller identifying corresponding cached data in a second data cache in response to the identification data, the second data cache under exclusive control of the second controller and not accessible to the first controller; and the second controller invalidating the corresponding cached data in the second data cache.

8. The storage array system claimed in claim 7, wherein the first and second controllers are further programmed or configured to effect the steps of:

the second controller initiating a read transaction in response to a data read request received from an external host, the read transaction preventing the first controller from accessing the persistent storage devices during the transaction;

the second controller determining if valid data responsive to the data read request is present in the second data cache;

if the second controller determines that valid data responsive to the data read request is present in the second data cache, then:

the second controller retrieving the valid data responsive to the data read request from the second data cache; and the second controller transmitting the data retrieved from the second data cache to the external host;

if the second controller determines that valid data responsive to the data read request is not present in the second data cache, then:

the second controller retrieving the valid data responsive to the data read request from at least one of the persistent storage devices, the data retrieved from the at least one of the persistent storage devices defining read data;

the second controller copying the read data to the second data cache; and the second controller transmitting the read data to the external host.

9. The storage array system claimed in claim 8, wherein: the step of receiving a data read request from an external host comprises second client logic communicating the data read request to second transaction logic; the step of the second controller initiating a read transaction in response to the data read request comprises second transaction logic determining if the data read request can be granted and, if the data read request can be granted, instructing second read/write logic to retrieve the read data from the at least one of the persistent storage devices.

10. The storage array system claimed in claim 9, wherein:

the step of the first controller copying the write data to a first data cache comprises the first read/write logic copying the write data to the first data cache; and the step of the second controller determining if valid data responsive to the data read request is present in the second data cache comprises the second read/write logic determining if valid data responsive to the data read request is present in the second data cache.

11. The storage array system claimed in claim 7, wherein:

the step of receiving a data write request and associated write data from an external host comprises first client logic communicating the data write request to first transaction logic;

the step of the first controller initiating a write transaction in response to the data write request comprises the first transaction logic determining if the data write request can be granted and, if the data write request can be granted, the first transaction logic instructing first read/write logic to store the write data in the at least one of the persistent storage devices.

12. The storage array system claimed in claim 11, wherein:

the step of the first controller copying the write data to a first data cache comprises the first read/write logic copying the write data to the first data cache;

the first controller transmitting identification data identifying the write data to the second controller comprises the first read/write logic transmitting the identification data to second read/write logic via a communication channel between the first and second controllers; and the step of the second controller invalidating the corresponding cached data in the second data cache comprises the second read/write logic invalidating the corresponding cached data.

13. A computer program product for caching data in a storage array having two controllers and an array of persistent storage devices, the computer program product comprising a non-transitory computer-readable storage medium on which are stored instructions for, when executed by the controllers, causing the storage array to:

receive a data write request and associated write data from an external host;

under control of a first controller, initiate a write transaction in response to the data write request, the write transaction preventing a second controller from accessing the persistent storage devices during the write transaction;

under control of the first controller, store the write data in at least one of the persistent storage devices in accordance with the write transaction;

under control of the first controller, copy the write data to a first data cache, the first data cache under exclusive control of the first controller and not accessible to the second controller;

after the write transaction completes, under control of the first controller, transmit identification data identifying the write data to the second controller but not transmit any of the write data itself to the second controller;

under control of the second controller, identify corresponding cached data in a second data cache in response to the identification data, the second data cache under exclusive control of the second controller and not accessible to the first controller; and under control of the second controller, invalidate the corresponding cached data in the second data cache.

14. The computer program product claimed in claim 13, wherein the instructions, when executed by the controllers, further cause the storage array to:
- receive a data read request from an external host;
- under control of the second controller, initiate a read transaction in response to the data read request, the read transaction preventing the first controller from accessing the persistent storage devices during the transaction;
- under control of the second controller, determine if valid data responsive to the data read request is present in the second data cache, and if the second controller determines that valid data responsive to the data read request is present in the second data cache, then:
  - under control of the second controller, retrieve the valid data responsive to the data read request from the second data cache; and
  - under control of the second controller, transmit the data retrieved from the second data cache to the external host;
- if the second controller determines that valid data responsive to the data read request is not present in the second data cache, then:
  - under control of the second controller, retrieve the valid data responsive to the data read request from at least one of the persistent storage devices, the data retrieved from the at least one of the persistent storage devices defining read data;
  - under control of the second controller, copy the read data to the second data cache; and
  - under control of the second controller, transmit the read data to the external host.

* * * * *